United States Patent
McEnroe et al.

(10) Patent No.: US 10,450,214 B2
(45) Date of Patent: Oct. 22, 2019

(54) HIGH OPTICAL QUALITY GLASS TUBING AND METHOD OF MAKING

(71) Applicant: Corning Incorporated, Corning, NY (US)

(72) Inventors: David John McEnroe, Corning, NY (US); Aniello Mario Palumbo, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/584,357

(22) Filed: May 2, 2017

(65) Prior Publication Data

US 2017/0355632 A1 Dec. 14, 2017

Related U.S. Application Data

(60) Provisional application No. 62/348,334, filed on Jun. 10, 2016.

(51) Int. Cl.
*C03B 19/04* (2006.01)
*C03B 17/04* (2006.01)
*C03B 17/02* (2006.01)

(52) U.S. Cl.
CPC ............ *C03B 17/04* (2013.01); *C03B 17/025* (2013.01); *C03B 19/04* (2013.01); *Y02P 40/57* (2015.11)

(58) Field of Classification Search
CPC ........ C03B 19/04; C03B 19/095; C03B 20/00
USPC ................. 65/68, 71, 72, 439, 494
See application file for complete search history.

(56) References Cited

U.S. PATENT DOCUMENTS

| | | | | |
|---|---|---|---|---|
| 1,527,729 A | * | 2/1925 | Dunajeff | B22D 11/144 164/297 |
| 2,543,303 A | * | 2/1951 | Rubissow | B22D 13/04 164/290 |
| 2,778,162 A | * | 1/1957 | Giffen | C03B 19/04 164/114 |
| 3,597,181 A | | 8/1971 | Prendergast | |
| 5,160,521 A | | 11/1992 | Tran | |
| H001259 H | * | 12/1993 | Aggarwal | C03B 19/04 65/388 |
| 5,837,334 A | | 11/1998 | Yokokawa et al. | |
| 6,405,565 B1 | | 6/2002 | Aitken et al. | |
| 7,891,213 B2 | | 2/2011 | Bogdahn et al. | |

(Continued)

FOREIGN PATENT DOCUMENTS

EP 790114 B1 6/2000

*Primary Examiner* — Cynthia Szewczyk
(74) *Attorney, Agent, or Firm* — Gregory V. Bean

(57) ABSTRACT

A laminated or single layer glass cylinder and its method of making are disclosed. The laminated cylinder glass is a precursor component to enable making subsequent drawn tubing having high optical quality. The laminated cylinder glass may comprise a first layer of glass as a clad glass and a second layer of glass as a core glass. The second layer of glass may be bound to the first layer of glass. The second layer may have a higher CTE from about $5\times10^{-7}/°$ C. to about $100\times10^{-7}/°$ C. than the first layer of glass. The first layer and second layer of glass may have different softening points within about 200° C. of each other. In some embodiments, the first layer and second layer of glass may have different softening points from about 50° C. to about 200° C. of each other.

15 Claims, 5 Drawing Sheets

(56) References Cited

U.S. PATENT DOCUMENTS

| | | |
|---|---|---|
| 8,061,162 B2 | 11/2011 | Bogdahn |
| 8,584,491 B2 | 11/2013 | Bogdahn et al. |
| 9,834,467 B2 | 12/2017 | Bisson et al. |
| 2002/0191926 A1 | 12/2002 | Gao |
| 2003/0104920 A1* | 6/2003 | Schwertfeger .......... C03B 19/06 501/54 |
| 2006/0130525 A1 | 6/2006 | Buellesfeld et al. |
| 2010/0132407 A1 | 6/2010 | Ganz et al. |
| 2011/0051360 A1 | 3/2011 | Dabov et al. |
| 2012/0231186 A1* | 9/2012 | Burns ................... C01B 33/037 428/34.1 |
| 2013/0023974 A1 | 1/2013 | Amrani |
| 2013/0024460 A1 | 1/2013 | Peterson et al. |
| 2013/0024970 A1 | 1/2013 | Wohleser |
| 2013/0168005 A1 | 7/2013 | Horowitz |
| 2013/0258569 A1 | 10/2013 | Amin et al. |
| 2014/0245796 A1 | 9/2014 | Bernard et al. |
| 2017/0247279 A1 | 8/2017 | Bisson et al. |

\* cited by examiner

Single core

HIGH OPTICAL QUALITY GLASS TUBING AND METHOD OF MAKING

This application claims the benefit of priority under 35 U.S.C. § 119 of U.S. Provisional Application Ser. No. 62/348,334 filed on Jun. 10, 2016, the content of which is relied upon and incorporated herein by reference in its entirety.

SUMMARY

The present disclosure relates generally to systems and methods for making or modifying the shape of a hollow glass structure, and more particularly to systems and methods for manufacturing high optical quality glass tubing.

In one embodiment, the present disclosure teaches a method for producing hollow cylinder of glass tubing. The method may be carried out by rotating a substantially elongated tubular mold. The tubular mold may have a substantially open end at one side, a substantially closed end at another side, and a cylindrical casting chamber between the substantially open end and the substantially closed end. The substantially elongated tubular mold may be rotated along an elongated axis passing through the open end and the closed end. At least a portion of the substantially elongated tubular mold may be heated at or above the strain point temperature ($\eta=10^{14.5}$ P) of the glass from which the glass tubing is formed. Molten glass may be delivered via stream or gob through the substantially open end into the cylindrical casting chamber while rotating the substantially elongated tubular mold. The substantially elongated tubular mold may be tilted to a substantially horizontal position while rotating the substantially elongated tubular mold. The substantially elongated tubular mold may be rotated on a generally horizontal axis to cause molten glass to assume a form of a cylindrical tube in response to the rotation of the mold. The cylindrical tube of glass may be cooled to be quenched to form a first glass cylinder within a range including solidified, isoviscous, or semi-solidified states.

In another embodiment, a laminated cylinder glass may comprise a first layer of glass and a second layer of glass. The first layer of glass may be used as a clad glass. A second layer of glass may be used as a core glass bound to the first layer of glass. The second layer may have a higher coefficient of thermal expansion (CTE) than the first layer of glass with a CTE difference from about $5\times10^{-7}/°$ C. to about $100\times10^{-7}/°$ C. The first layer and second layer of glass may have different softening points within about 200° C. of each other.

Additional features and advantages of the present disclosure will be set forth in the detailed description, which follows, and in part will be readily apparent to those skilled in the art from that description or recognized by practicing the embodiments described herein, including the detailed description, the claims, and the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF SEVERAL VIEWS OF THE DRAWINGS

The following is a description of the figures in the accompanying drawings. The figures are not necessarily to scale, and certain features and certain views of the figures may be shown exaggerated in scale or in schematic in the interest of clarity or conciseness.

Figure 1A:
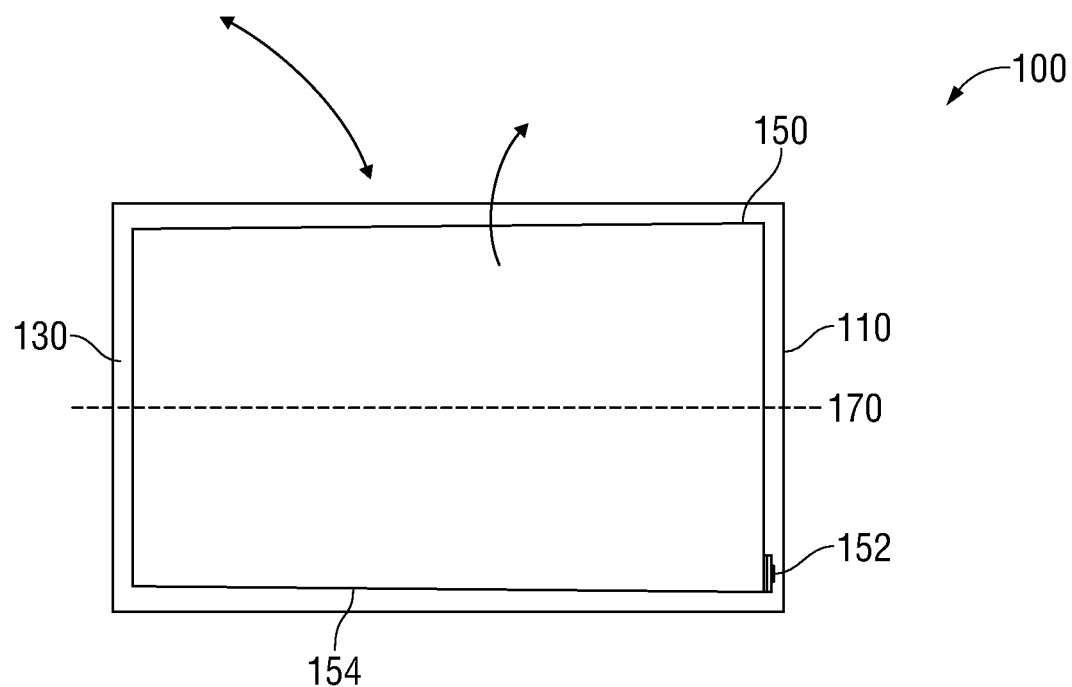
FIG. 1a is a cross-sectional view of an elongated tubular mold according to one embodiment.

The foregoing summary, as well as the following detailed description of certain inventive techniques, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION

The present disclosure can be understood more readily by reference to the following detailed description, drawings, examples, and claims, and their previous and following description. However, before the present compositions, articles, devices, and methods are disclosed and described, it is to be understood that this disclosure is not limited to the specific compositions, articles, devices, and methods disclosed unless otherwise specified, as such can, of course, vary. It is also to be understood that the terminology used herein is for the purpose of describing particular aspects only and is not intended to be limiting.

The following description of the disclosure is provided as an enabling teaching of the disclosure in its currently known embodiments. To this end, those skilled in the relevant art will recognize and appreciate that many changes can be made to the various aspects of the disclosure described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

Reference will now be made in detail to the present preferred embodiment(s), examples of which are illustrated in the accompanying drawings. The use of a particular reference character in the respective views indicates the same or like parts.

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In some embodiments, the term "about" means plus or minus 10% of the numerical value of the number with which it is being used. Therefore, about 50% means in the range of 45%-55%.

As used herein, "strain point" temperature values means the temperature at which the glass product has a viscosity of $10^{14.5}$ in units of poise, and is determined in accordance with a fiber elongation method based on American Society for Testing and Materials (ASTM) C336-71.

As used herein, "coefficient of thermal expansion" values (or CTE values) are determined using an Orton dilatometer in accordance with ASTM E228-06 over a temperature range of 25° C. to 300° C.

Terminology of a short and long glass used herein signifies that a short glass is a comparative term signifying a fast-setting glass. Long glass is a comparative term signifying a slow-setting glass ("The Handbook of Glass Manufacture" Tooley volume II 1974). A fast setting glass has a steep viscosity curve and will become solid or more viscous over a shorter time period and lesser temperature range. A slow-setting glass has a shallow viscosity curve and will become solid or more viscous over a longer time period and greater temperature range.

Broadly, the present disclosure relates to systems and methods for making or modifying the shape of a hollow glass structure, and more specifically, to single layer or laminated cylindrical glass having high optical quality via spin or rotational casting. The advantage of tube fabrication by rotational casting is to obtain an optically clear tube free from surface imperfections created when molten glass is drawn over some type of forming tools such as an orifice ring, bell or mandrel that exists with current tubing manufacturing process. The art of this disclosure is to produce good optical clarity tubing that can be reshaped into the desired geometry wanted for electronic devices or other tubular products. A two-step process to fabricate tubing is done by first rotationally casting large diameter glass cylinders and then redrawing cylinders into the required tube sizes. Molten glass is poured into a rotating mold inside a drum that is spun at high rpms to move the glass against the mold walls by centrifugal force. The internal glass surface of the cylinders has not touched any other surface and is therefore pristine. The outside of the cylinder has come into contact with the mold so it will require some finishing by grinding and polishing. By making a large cylinder and then redrawing it into hundreds of feet of smaller tubing will eliminate the need to grind and polish each individual tube if high optical clarity is required. The redraw process enables less stringent tolerances on the cylinder since by redrawing at certain reduction ratios, the tolerances can be improved and minor defects in the cylinder are reduced in size to become insignificant.

Consumer handheld and wearable electronic manufacturers have an interest in using all glass body with which to encapsulate their products. The glass body or sleeve is a three dimensional shape, currently formed from a starting round tube of glass. Good geometrical tolerances have been met by reshaping glass tubing, but one attribute that has eluded this forming process is optical clarity, especially on the reformed flat surfaces. To obtain good optical clarity of the sleeve, the initial tubing has to have a high degree of optical clarity. In-house drawn tubing plus commercial tubing all show some surface optical perturbations called paneling. Paneling is a result of molten glass contact with forming tooling used to make the tubing. The process of using an orifice ring and internal bell or mandrel over which the glass flows in order to create a hollow tube causes paneling in the interior and exterior of the hollow tube. Paneling results because the viscosity of the molten glass is high enough to allow the forming tooling to impart longitudinal lines onto the surface of the resulting tubing as the glass flows over the tooling.

These longitudinal paneling lines are a series of peaks and valleys on the tube surface from the glass contact with the metal tooling. The peaks and valleys are very small on the order of 5 to 100 nanometers and are not highly visible on the round tube. Using a shadowgraph technique in which a xenon light is shown through the tubing creating a shadow on a white background, the paneling becomes apparent. When the tubing is reformed into a sleeve shape, the flat areas on the sleeve can show paneling especially when viewing a display through the sleeve wall. The display area is critical for electronic devices such as phones, watches and other display related products. A clear optical surface may be required so no distortions in the display may be observed. If the internal and external tube surfaces are ground and polished, the paneling can be reduced or eliminated, but achieving this surface polish is very difficult timely and costly.

Generally, three dimensional shaped glass bodies or sleeves are currently formed by starting with a round tube of glass. Strengthened and durable tubing is of interest for use for vials or syringes for pharmaceutical packaging. Current pharmaceutical vessels are made via using round tubing which is then converted by flame working the tubing on automated machines. A laminated tube in both of these applications can provide higher strength and enable the compositions to be tailored to provide other enhancements like anti-microbial, durability, color esthetic and hardness. The advantage of a laminated tube, over other strengthening techniques like ion exchange, is that creating a deep compressive layer of glass on the outer surface may provide a glass layer of thickness equal to that provided by an outer clad glass. Ion exchange requires long time and higher temperatures to create compressive stress depths on the order of 100 microns whereas a laminated tube having an outer layer in compression can be on the order of a number of millimeters. This is important in manufacturing environment where containers can bump into each other creating flaws that can be deeper than the ion exchange depth resulting in failure of the part.

The laminated tubing can have two, three or multiple layers of different glasses depending on the ability to perform the rotational casting to create a cylinder with many layers. Having different glasses as discussed above may bring value added attributes to a single formed tube that cannot exist with a single composition tube. Making a macro size glass cylinder (such as laminated cylinder), then redrawing it to a smaller desired tube size help to reduce any imperfections and obtain greater tolerances on the final tubing.

Figure 1B:
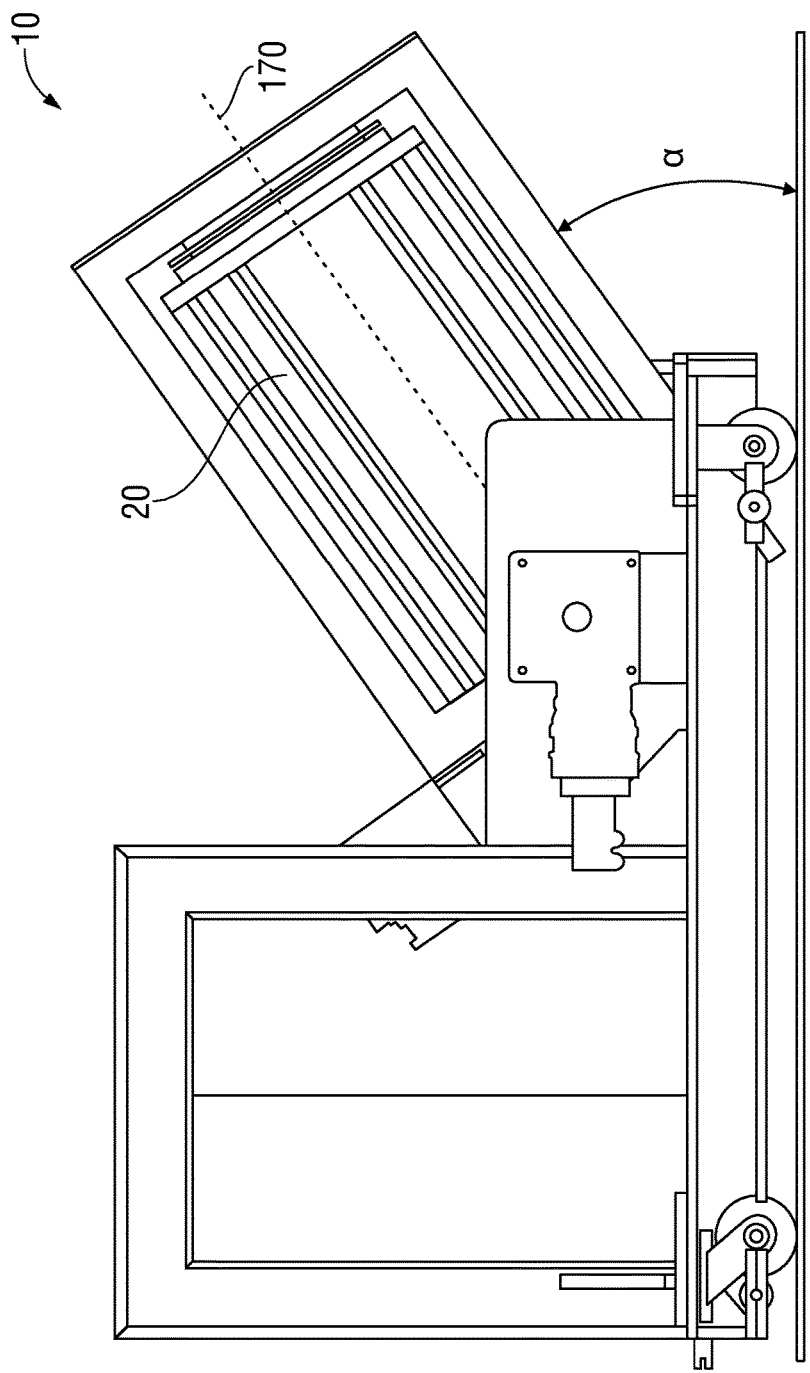
FIG. 1b is a side-view of a rotational caster according to one embodiment.
Figure 1C:
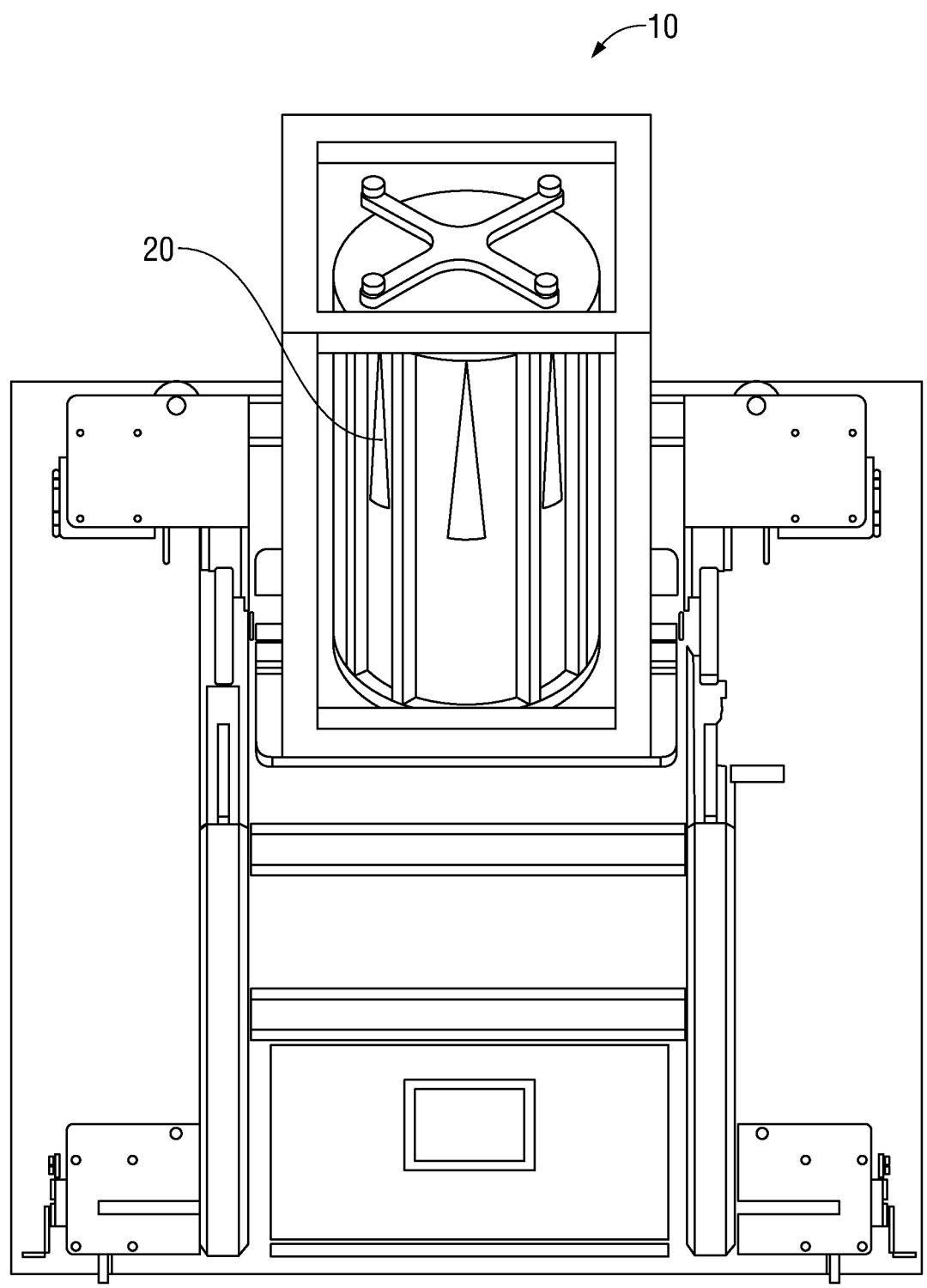
FIG. 1c is a top-view of the rotational caster according to one embodiment.

In one embodiment, as shown in FIG. 1, the present disclosure teaches a method for producing a hollow cylinder of glass tubing as a precursor preform to make high optical quality tubing. The method may be carried out by rotating a substantially elongated tubular mold 100. The tubular mold may have a substantially open end 110 at one side, a substantially closed end 130 at another side, and a cylindrical casting chamber 150 between the substantially open end 110 and the substantially closed end 130. The cylindrical casting chamber 150 may be the inside surface of the tubular mold 100 or may be an insert adapted to fit inside of the tubular mold. The substantially elongated tubular mold may be rotated along an elongated axis 170 passing through the substantially open end 110 and the closed end 130. At least a portion of the substantially elongated tubular mold may be heated close to the strain point temperature ($\eta=10^{14.5}$ P) of the glass from which the glass tubing is formed. Molten glass may be delivered via stream or gob through the substantially open end 110 into the cylindrical casting chamber 150 while rotating the substantially elongated tubular mold 100. The substantially elongated tubular mold 100 may be tilted to a substantially horizontal position while rotating the substantially elongated tubular mold 100. The substantially elongated tubular mold 100 may be rotated on a generally horizontal axis 170 to cause molten glass to assume a form of a cylindrical tube in response to the rotation of the mold 100. The cylindrical tube of glass may be cooled to be quenched to form a first glass cylinder within a range including solidified, isoviscous or semi-solidified states.

The substantially elongated tubular mold 100 may be from about 50 mm to about 500 mm outer diameter, for example, as shown in FIG. 1b. In one embodiment, the outer diameter may range from about 100 mm to about 400 mm, for example. In further embodiment, the outer diameter may be about 200 mm to about 300 mm, for example. In one embodiment, the length of cylinder may range from about 250 mm to about 2,000 mm, for example. In another embodiment, the length of cylinder may range from about 400 mm to about 1,000 mm. In yet another embodiment, the length of cylinder may range from about 600 mm to about 800 mm. The substantially elongated tubular mold may be inserted into a rotational drum 20. The drum may be tilted at various angles to allow the molten glass to flow in the mold while rotating to achieve more uniform walls. The rotational drum and the substantially elongated tubular mold 100 are a part of a rotational caster 10. A glass may be melted and conditioned in a furnace in proximity to the rotational caster 10. The rotational caster 10 may be mobile, which enables placement under a melter, and relocation near different furnaces. Glass viscosity may be important for rotational casting. If the glass is too viscous (>1000 P), it may not spread out to the mold walls and may create a thicker wall near the bottom of the cylinder compared to the top. If the glass is too fluid (<<10 P), it could form thinner glass walls of the resulting cylinder than wanted. The overall wall thickness may depend on cylinder diameter, but a range of wall thickness may include a summation of diameter layers from about 2 mm to about 50 mm. In another embodiment, the wall thickness may be from about 5 mm to about 25 mm. In further another embodiment, the wall thickness may be from about 10 mm to about 20 mm.

A quartz glass for instance, would be extremely difficult to be rotationally cast due to the high temperatures required to achieve the correct viscosity of the glass (≥1900° C.). Quartz is a very short glass with a steep viscosity curve that solidifies quickly with loss of temperature.

A molten glass may be delivered to the rotational caster by a heated crucible, ladle or flowing directly into the mold 100 seated inside the rotational caster. If a crucible is used to convey the glass to the rotational caster, it should be preheated at or above the temperature of the glass in the furnace. The glass should not be cooled because it will become more viscous as it is delivered to the rotational caster. Viscosity may range from about 15 P to about 500 P for pouring glass into a rotational mold. In one embodiment, the viscosity may range from 25 P to about 300 P. In further embodiment, the viscosity may range from about 50 P to about 100 P. For example, a soda-lime-silicate glass is melted in a furnace and conditioned at 1350° C. The glass is then delivered out of the furnace via a down-comer tube into a preheated crucible which is heated in a separate furnace to 1500° C. After the crucible receives the correct volume of glass in it, the crucible is transported or conveyed by hands or mechanized equipment to the rotational caster and the molten glass is poured into the mold. The mold may be made of at least one of graphite, ceramics, inconel, platinum or combinations thereof. When pouring the glass into the rotational caster, the rotational caster is upright in a vertical position in one embodiment. In another embodiment, the rotational caster is tilted at a certain angle α to the horizontal position. The rotational rate that the glass is started and spun at can be a function of a number of dependent and/or independent properties. In some cases the rotational rate that the glass is started and spun at can be a function of the glass viscosity, glass temperature, method of glass delivery, mold temperature, mold size and geometry, mold materials, and glass cooling rates. While pouring the glass, the rotation rate may be from about 50 rpm to about 750 rpm. In one embodiment, the rotational rate may be started at approximately 400 rpm. In another embodiment, the starting rate may be low at the beginning about 100 rpm. As the glass cools and solidifies, the rotation rate may go up to 400 rpm to have the centrifugal force overcome increased viscosity. The glass viscosity may be less than 2000 P. In one embodiment, the viscosity may range from about 50 P to about 2,000 P. In another embodiment, the viscosity may range from about 100 P to about 1,000 P. In further embodiment, the viscosity may range from about 200 P to about 500 P. The glass may be spun outward against the mold walls, preferably made of graphite, with rotation. In the vertical position, the glass may start to climb up the walls of the mold due to centrifugal force. If a cylinder is allowed to form when the caster is in a vertical position, a wall variation is observed, resulting in the bottom of the cylinder having a much thicker wall than the top.

To induce a more uniform wall in the glass cylinder, the rotational caster is tilted down to a horizontal position. In one embodiment, the angle α may range from about 90 degrees to about 0 degree. In another embodiment, the angle α may range from about 60 degrees to about 0 degree. In further another embodiment, the angle α may range from about 45 degrees to about 0 degree. This may allow the glass to flow towards the top of the cylinder, which can even out the wall thickness. The substantially elongated tubular mold may comprise an inner flange 152 adjacent to the open end of the substantially elongated tubular mold to keep the cylindrical tube of glass from flowing out of the substantially elongated tubular mold while horizontal. The cylindrical casting chamber may have a taper 154 from the substantially closed end 130 to the substantially open end 110 so as to ensure a release of the cylindrical tube. Most tapers usually may not be more than 5 degrees unless the final shaped glass has a taper as a part of its shape. Normally a 1 to 2 degree taper may be sufficient to allow the glass to be released from the mold. For the cylinder, if too great a taper is present, it may complicate the redraw process in maintaining geometry of the drawn tubing.

Optional in any embodiment, the method of producing a hollow cylinder of glass may further include a step of delivering a second glass of different composition from the first layer of glass into the mold inside the first glass cylinder and spinning to make a second concentric cylinder inside the first. The second glass may be delivered to the rotational caster by a heated crucible, ladle or flowed directly into the mold seated inside the rotational caster. The glass composition of the first and the second layers of glass may have different coefficient of thermal expansion (CTE). Optionally in any embodiments, a third glass of the same or different composition from the first and second layers of glass may be delivered into the mold inside the second glass cylinder and may be spun to make a third concentric cylinder inside the first and second. The second and the third glass may have different coefficients of thermal expansion. Each of the first and the third CTE may be from about $20 \times 10^{-7}/° C.$ to about $100 \times 10^{-7}/° C.$, and the second CTE may be from about $25 \times 10^{-7}/° C.$ to about $120 \times 10^{-7}/° C.$ A further number of subsequent glass may be delivered into the mold inside the third glass cylinder and may be spun into cylinders inside the initial cylinder of glass.

The rotation of the glass in the rotational caster may continue until the glass has set-up and no longer can flow. The timing may depend on the viscosity curve of the glass, where a longer glass will take more time to setup than a shorter glass. Once the glass is solid, the rotational caster is kept horizontal and the resulting glass cylinder may be slid out of the mold and transferred into an annealing oven. A graphite mold may act as a release agent due to the lubricity of the graphite. If alternative mold materials are used, a release agent such as hexagonal boron nitride (hBN) may be used. Use of a release agent may probably emboss a texture onto the outer surface of the cylinder and subsequent grinding and polishing of the outer surface may be required. Graphite foil may also be used to assist in releasing the glass cylinder from the mold.

The method for producing a high optical quality hollow cylinder of glass may further include annealing the cylindrical tube of glass. After annealing, it can then be machined to clean up the outer surface by grinding and polishing out the surfaces of the cylindrical tube of glass to obtain a good surface condition with even wall thickness.

The method further comprises cleaning the cylindrical tube of glass by water or acid etching or both. One or more layers of glass may have a portion of surface removed or the entire glass layer removed via etching, such as acid etching. HF may be used as an etching acid. The first glass layer may be a low temperature glass or soft glass (which may also be called sacrificial glass). The soft glass or sacrificial glass may be susceptible to etching. In some embodiments, a laminated cylindrical glass having two or more layers and having the first layer removed may obtain a pristine second layer. In cases where there are multiple layers (such as four layers), the second layer may become the "outer" layer upon etching the first layer, so CTEs for a strengthened laminate glass may have to be considered. In most cases, the etching of the outer layer glass may only remove grinding contamination or perform an etching polish of the surface. A surface etching process can also be implemented to reduce the overall thickness of the cylinder wall or thickness of the inner or outer clad layer. If a very thin clad layer is required on the final tube geometry; it could disable or bypass the process to successfully spin a cylinder with the required thickness especially if a thin outer clad layer of the cylinder is desired. A post etching process could remove glass from the interior and or exterior cylinder walls to reduce the overall thickness of the layers and after drawing result in thinner clad layers on the resulting tubing.

Once the cylinder has been cleaned up by machining with a possible post acid polishing step, it is ready to redraw into a final tube geometry. Spending the time and cost on the cylinder may be made up if good quality tubing of the correct geometry and optical clarity is achieved. For example, if a 300 mm diameter cylinder is drawn down to 25 mm tubing, about 150 feet of tubing may be obtained from one foot of cylinder. It is possible to flame work/splice several cylinders together to make a longer cylinder preform. Longer preforms enable drawing multiple cylinders at one time which improves overall material usage of the cylinders and produce more tubing for a single draw.

In one embodiment, a start of the cylindrical tube of glass may be fed by a down feed system. When redrawing, the cylinder is placed on the down feed system and slowly lowered into a heated draw furnace at a feed rate $v_f$ from about 0.2 mm/min to about 100 mm/min to a heating zone with a heating zone temperature $T_h$ from about 300° C. to about 1500° C. corresponding to a viscosity range from about $10^4$ P to about $10^7$ P depending on glass composition. The end of the cylinder may be heated up and then may be attenuated down in size to make the final tube size. A component strand in a direction of a drawing axis may be drawn off from the softened region so as to elongate and reduce size of cylinder to form various diameter sizes of cylindrical tube of glass and at a draw rate $v_d$ from about 0.01 m/min to about 100 m/min.

The drawing rate, viscosity of glass and downfeed rate may control the various diameter sizes of the drawn cylindrical tube. The drawing speed may be adjusted by a pulling unit. Reduction ratios of drawn cylinder can be 2:1 to 2000:1, for example. A cylinder of 250 mm diameter with a reduction ratio of 2:1 would form tubing having a 125 mm diameter while 2000:1 tube may be 0.125 mm diameter. Since the inside of the cylinder surface is untouched or acid etched/polished, it will have a pristine surface and the outside of the tube being polished may have a panel free surface. The various diameter sizes of the resulting drawn cylindrical tube will have diminished (roughness) oscillating peaks and valleys on the surface. Measurements of roughness can be done using a white light interferometer, such as the New View 5000 available from Zygo Corp. The (surface roughness) oscillating peaks and valleys may average at nanometer levels, such as from about 5 nanometers to about 20 nanometers. By attenuating the larger cylinder down in size, any surface defects from polishing may be reduced to an insignificant size and tighter tolerances on geometry can be gained on the drawn tubing compared with the cylinder. Reduction ratio of the draw may reduce defects the same as diameter. If a reduction ratio of 12.5:1 is used to make 20 mm diameter tube from a 250 mm diameter cylinder, a defect of 50 nm may now be 4 nm in size and may be too small to be seen by naked eyes. Tubing tolerances may also hold true to reduction ratio and a starting tolerance of +/−1.00 mm on the cylinder may be +/−0.08 mm on the drawn tube.

Inside surface of a soda-lime tube fabricated via a traditional down drawing method may have surface roughness of Ra=0.025 micron (25 nm) and rms=0.058 micron (58 nm). Outside surface of a soda-lime tube fabricated via a traditional down drawing method may have surface roughness of Ra=0.026 micron (26 nm) and rms=0.080 micron (80 nm). By using the present spin casting and down drawing technique, the inside surface of drawn tube has less surface roughness of Ra=0.341 nm, rms=0.441 nm. Outside surface of in-house drawn tube has less surface roughness of Ra=1.312 nm, rms=2.157 nm. The present spin casting and down drawing technique can significantly improve surface quality as well as improve strength of glass tube.

To fabricate a multi-layer laminated cylinder, once the first glass has set-up and solidified, a second glass may be poured into the rotational caster. The caster may be positioned back up into a vertical or angled position and the second glass delivered inside the first solidified cylinder. The first cylinder of glass may still be hot enough that contact with the second molten glass does not thermal shock the glass. Most qualitative in nature is glass color change as it cools. By the time when all color from heat leaves from the glass, it becomes close to its strain point. But if too much time is taken and the first glass is cooled below its strain point, then cracking could occur. Normally, delivering the second glass within a few minutes of the already formed first cylinder being setup may suffice. The process may be repeated multiple times until a number of layers may be achieved.

Figure 2:
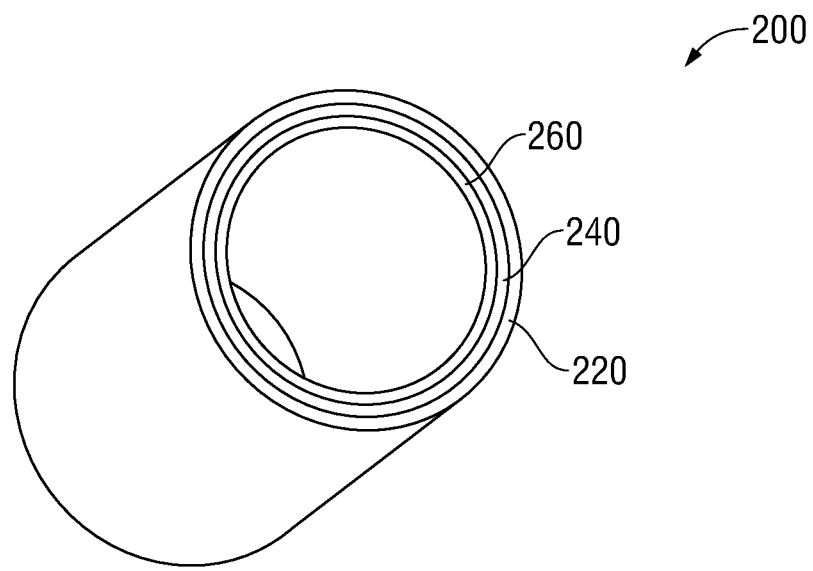
FIG. 2 is a perspective view of a three-layer glass cylinder according to one embodiment.

If the fabricated laminate cylinder is redrawn into tubing, the laminate structure may be maintained since the glass viscosity is high enough during drawing to prevent the glass layers from mixing. As shown in FIG. 2, a high optical quality laminated cylindrical glass 200 may have a first layer of glass 220 and a second layer of glass 240. The first layer of glass 220 may be used as a clad glass, such as an outer clad glass. The second layer of glass 240 may be used as a core glass. The second layer of glass 240 may be bound to the first layer of glass 220.

The second layer of glass 240 may have a higher CTE than the first layer of glass 220. The laminated cylindrical glass may further include a third layer of glass 260 bound to the second layer of glass 240. The third layer of glass 260 may be used as an inner clad glass. When considering what glass compositions to choose from for laminating, several parameters have to be considered. To create strengthened tubing, a thermal expansion coefficient on the outer clad glass may have to be less than the expansion coefficient of the inner core glass. The inner clad glass may have an expansion coefficient less than the core glass, which may keep both the inner and outer surface glass in compressional stress when cooled. The third layer may also have lower CTE than the first layer of glass. The difference between the thermal expansions may depend on the compressive stress desired. The CTE difference between the first layer of glass 220 and the second layer of glass 240 may be from about $5\times10^{-7}/°$ C. to about $100\times10^{-7}/°$ C. The first layer of glass 220 and the second layer of glass 240 may have different softening points from about 50° C. to about 200° C. of each other. The first layer of glass 220 may have different composition as the second layer of glass 240. The third layer of glass 260 may have the same or different composition as the first and second layers of glass 220.

Figure 3:
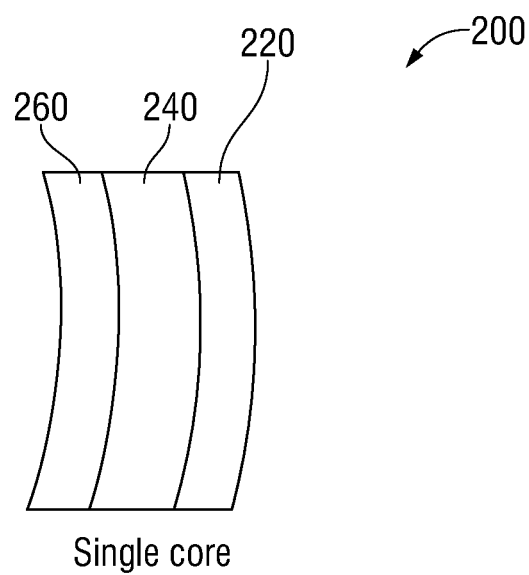
FIG. 3 is a cross-sectional view of a laminated cylindrical glass with a single core according to another embodiment.

As shown in FIG. 3, the second layer of glass 240 as a core glass may be much thicker than the first layer of glass 220 and the third layer of glass 260 as clad glass. The third layer of glass 260 may have the same or different composition as the first layer of glass 220. The glass composition of the second layer of glass 240 and third layer of glass 260 may have different coefficient of thermal expansion. Geometry of the spun cylinder may take on any size and wall thickness. For example, a 250 mm diameter cylinder drawn down to 25 mm tube outer diameter has a reduction ratio of about 10:1. If the cylinder wall is 20 mm thick, then the resulting tube wall may be 2 mm thick. This holds the same for the laminated layer thicknesses corresponding to the resulting thickness of the tube. If a 200 micron outer clad, 800 micron core and a 200 micron inner clad is required for the tube, the cylinder may have to have an outer clad thickness of 2 mm, core 8 mm and inner clad 2 mm. Therefore, the range of thickness for the cylinder wall is variable depending on the required tube geometry. A thickness range for a 250 mm diameter cylinder wall would be from about 2 mm to about 50 mm, preferred from about 5 mm to about 35 mm and best from about 10 mm to about 20 mm. This thickness may represent the sum of all the laminate layers with each individual layer making up some proportion of the total thickness. If smaller cylinders are formed, the wall thickness usually is reduced while large cylinders may have thicker walls. This proportion exists more from a structural integrity standpoint where it may be difficult to handle a 400 mm diameter cylinder having only a 2 mm wall thickness. As discussed previously, many methods, such as a surface etching process, could be implemented to reduce the overall thickness of the cylinder wall or thickness of the inner or outer clad layer.

Figure 4:
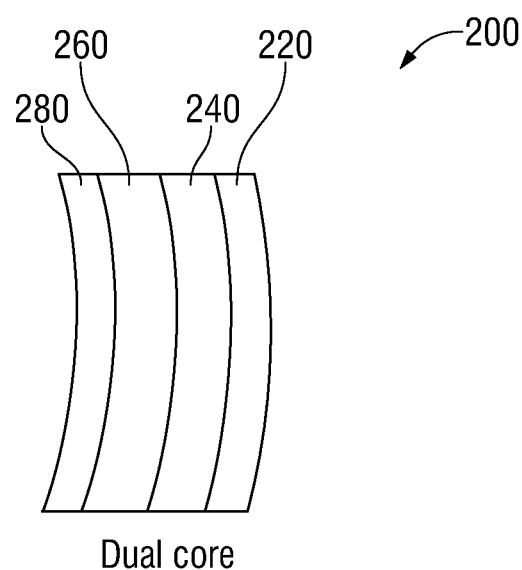
FIG. 4 is a cross-sectional view of a laminated cylindrical glass with a dual core according to yet another embodiment.

As shown in FIG. 4, the high optical quality laminated cylindrical glass 200 may further include a fourth layer of glass 280 bound to the third layer of glass 260. The second layer of glass 240 and the third layer of glass 260 may be used as dual core glass.

As mentioned before, a possible application for laminated tubing could be pharmaceutical packaging. The need for strong containment vessels for expensive drugs is straight forward but having a durable material that impedes leaching or extracting something into the drug is important especially with the current concerns with plastics. Three or four layered laminated cylinder may be tailored to make tubing having a strong hard outer glass to protect from damage, improved strength for a whole container, and a durable inner surface impervious to chemicals such as pharmaceuticals. For a practical use of a laminated tube for electronic devices that add strength of the laminated glass, a glass that could be anti-microbial or one that is hard in order to resist scratches or both may be used.

Example I

Glass A—CTE $91\times10^{-7}/°$ C. and softening point—840° C.

Glass B—CTE $66\times10^{-7}/°$ C. and softening point—880° C.

Glass A may be used as a core glass. Glass B may be used as an outer or inner clad glass. The CTE difference between glass A and glass B of $25\times10^{-7}/°$ C. may be a good value. The typical CTE difference range is 5 to $100\times10^{-7}/°$ C. A range of 20 to $50\times10^{-7}/°$ C. may be the best. The softening point of the glass pairs needs to be within 200° C. of each other. In some embodiments, the softening point of the glass may be from about 50° C. to about 200° C. of each other.

The softening point of the glass pairs may be best within 50° C. If the softening point is too far apart, one glass could remain viscos while the other is solid. This could deform the cylinder if extracted hot out of the rotational mold or during redrawing, one glass could start to draw down but the other is stiff and unyielding to draw down. A viscosity matched pair of glass is optimal for any forming processes but some viscosity difference of +/−1000 P is formable.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. For example, FIGS. 1-4 are merely a schematic illustration of a laminated cylindrical glass 200 according to one embodiment of the present disclosure. A variety of laminated cylindrical glass are contemplated herein, the structural details of which may be conveniently gleaned from the present description, the accompanying drawings, and the appended claims. FIGS. 1-4 are presented for illustrative purposes and are not intended to create a presumption that each of the various aspects illustrated therein is a necessary part of the various embodiments contemplated herein.

The claims appended hereto should be taken as the sole representation of the breadth of the present disclosure and the corresponding scope of the various embodiments described herein. Further, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

It is also noted that recitations herein of "at least one" component, element, etc., should not be used to create an inference that the alternative use of the articles "a" or "an" should be limited to a single component, element, etc.

It is further noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, are to be taken as a definite recitation of the structural characteristics of the component.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A method for producing a high optical quality hollow cylinder of glass tubing, comprising:

rotating a substantially elongated tubular mold having a substantially open end at one side, a substantially closed end at another side, and a cylindrical casting chamber between the substantially open end and the substantially closed end, the substantially elongated tubular mold being rotated along an elongated axis passing through the open end and the closed end;

heating at least a portion of the substantially elongated tubular mold at or above a strain point temperature ($\eta=10^{14.5}$ P) of the glass from which the glass tubing is formed;

delivering molten glass via stream or gob through the substantially open end into the cylindrical casting chamber while rotating the substantially elongated tubular mold;

tilting the substantially elongated tubular mold to a substantially horizontal position while rotating the substantially elongated tubular mold;

rotating the substantially elongated tubular mold on a generally horizontal axis;

causing molten glass to assume a form of a cylindrical tube in response to the rotation of the mold; and cooling the cylindrical tube of glass to be quenched to form a first glass cylinder within a range including solidified, isoviscous or semi-solidified states.

2. The method of claim 1, wherein the substantially elongated tubular mold is made of at least one of graphite, ceramics, inconel, platinum or combinations thereof.

3. The method of claim 1, further comprising cleaning the first glass cylinder by water or acid etching or both, or grinding and polishing outer surfaces of the first glass cylinder to obtain a good surface condition with consistent wall thickness.

4. The method of claim 1, wherein the substantially elongated tubular mold comprises an inner flange adjacent to the open end of the substantially elongated tubular mold to keep the cylindrical tube of glass from flowing out of the substantially elongated tubular mold.

5. The method of claim 1, further comprising redrawing the first cylinder of glass by feeding the first cylinder of glass into a down feed system at a feed rate $v_f$ from about 0.2 mm/min to about 100 mm/min to a heating zone with a heating zone temperature $T_h$ from about 300° C. to about 1500° C. corresponding to a viscosity range from about $10^4$ P to about $10^7$ P.

6. The method of claim 5, further comprising softening the first cylinder of glass in the heating zone so as to form a softened region.

7. The method of claim 6, further comprising drawing off a component strand in a direction of a drawing axis from the softened region so as to elongate and reduce the size of the cylindrical tube to form various diameter sizes of a cylindrical tube of glass and at a drawing rate $v_d$ from about 0.01 m/min to about 100 m/min, wherein the drawing rate, viscosity of glass, and downfeed rate control the various diameter sizes of the cylindrical tube.

8. The method of claim 7, wherein the various diameter sizes of the cylindrical tube have diminished roughness on the surface, wherein the rms roughness of the inside surface of the cylindrical tube is from about 5 nanometers to about 20 nanometers.

9. The method of claim 1, wherein the rotating rate is from about 50 rpm to about 750 rpm.

10. The method of claim 1, wherein the cylindrical casting chamber has a taper from the substantially closed end to the substantially open end so as to ensure a release of the cylindrical tube.

11. The method of claim 1, further comprising delivering a second glass of different composition from the first into the mold inside the first glass cylinder and spinning to make a second concentric cylinder inside the first.

12. The method of claim 11, further comprising delivering a third glass of the same or different composition from first into the mold inside the second glass cylinder and spinning to make a third concentric cylinder inside the first and second, wherein the glass composition of the second and the third glass have different coefficients of thermal expansion.

13. The method of claim 12, wherein each of the first and the third CTE is from about $20 \times 10^{-7}/°$ C. to about $100 \times 10^{-7}/°$ C., and the second CTE is from about $25 \times 10^{-7}/°$ C. to about $120 \times 10^{-7}/°$ C.

14. The method of claim 11, wherein the glass composition of the first and the second glass have different coefficient of thermal expansion (CTE).

15. The method of claim 11 further comprising removing or reducing one or more layers of glass via etching mechanical means.

* * * * *